3,595,616
Patented July 27, 1971

3,595,616
METHOD OF PRODUCING CARBONYLS OF METALS OF THE VI AND VII GROUPS AND CARBONYL OF COBALT AND VANADIUM
Nikolai Alexandrovich Belozersky, Kirovsky prospekt 42b, kv. 36, and Olga Davidovna Krichevskaya, Ulitsa Vosstania 9, kv. 33, both of Leningrad, U.S.S.R.
No Drawing. Filed Sept. 20, 1968, Ser. No. 761,292
Int. Cl. C01g 1/04
U.S. Cl. 23—203C    3 Claims

ABSTRACT OF THE DISCLOSURE

A method of producing carbonyls of Groups VI and VII metals and also of cobalt and vanadium which comprises subjecting metals of Groups VI and VII, cobalt, vanadium or compounds thereof, to carbonylation in the presence of iron and/or nickel under superatmospheric pressure and at elevated temperature, followed by condensing the carbonyls of said metals from the resulting gas-vapor mixture while said mixture is being refluxed with liquid carbonyls of iron and/or nickel.

---

The present invention relates to methods of producing carbonyls of metals of the VI and VII groups and carbonyls of cobalt and vanadium.

The said compounds are used in metallurgy for producing metals by thermal decomposition of these compounds, for obtaining coatings from the gas phase, as catalysts in chemical processes, as anti-knocking additives for liquid fuels, etc.

There is known in the art a method of producing carbonyls of the metals of the VI and VII groups and carbonyls of cobalt and vanadium by the carbonylation of said metals or their derivatives, as well as salts in the presence of iron and/or nickel, which consists in heating under pressure followed by the condensation of the carbonyl derivatives of said metals from the vapor-gas mixture produced in the system comprising a series of consecutively connected traps (cf., molybdenum, tungsten, niobium, collected papers of the Institute of Metallurgy, USSR Academy of Sciences, Moscow, 1967).

The disadvantage of the known method lies in the inefficient trapping of the final products during the condensation stage (up to 77–80%) and the complexity of the equipment used in the process which comprises a large number (up to 8) of traps.

It is an object of the present invention to eliminate the above-mentioned disadvantages.

It is a further and more specific object of the invention to provide a method of producing carbonyls of the metals of the VI and VII groups and carbonyls of cobalt and vanadium which would make it possible to raise the efficiency of trapping carbonyls of said metals (up to 99%) and simplify the equipment used in the process.

According to the invention, these objects have been accomplished by carrying out the condensation of the final products under conditions of simultaneous spraying of the vapor-gas mixture with liquid carbonyls of nickel and/or iron. This causes the artificial seeding of crystallization centers for the vapors of carbonyls of the metals of the VIth and VIIth groups as well as carbonyls of cobalt and vanadium, which provides for more complete trapping of the final products in the trap.

In producing carbonyls of the metals of the VI and VII groups and carbonyls of cobalt and vanadium by carbonylation of the salts of the said metals in the presence of iron and/or nickel, for the spraying of the vapor-gas mixture can also be used liquid carbonyls of nickel and/or iron produced as byproducts in the said carbonylation process.

In producing carbonyls of the metals of the VIth and VIII groups and carbonyls of cobalt and vanadium by carbonylation of these metals, their oxides, hydroxides, or sulfides, the process can be carried out in the presence of iron and/or nickel, so that the liquid carbonyls of iron and/or nickel formed in the said process as the byproducts are used for spraying the vapor-gas mixture containing the vapors of the final products.

The present method of producing carbonyls of the metals of the VI and VII groups and carbonyls of cobalt and vanadium is carried out in the following manner.

The metals of the VI and VII groups, cobalt, vanadium or the compounds thereof are charged into the reactor, and the carbonylation is carried out at 50–300° C. and at a pressure from 50 to 300 atm. The carbonylation of the salts of said metals is carried out in the presence of iron and/or nickel. The carbonylation of said metals and their oxides, hydroxides, or sulfides can be carried out in the presence of iron and/or nickel or without them.

The vapor-gas mixture produced in the carbonylation consisting of vapors of the carbonyls of metals and carbon monoxide enters into the trap (the unit can consist of two consecutively connected traps of which the second one is for control). In the trap the vapor-gas mixture is cooled, while being simultaneously sprayed by the liquid carbonyls of iron and/or nickel circulating through the said trap.

In the process the final products pass from the vapor phase state to the solid phase state, forming crystals which are separated from the liquid carbonyls in the trap.

The spraying of the gas-vapor mixture can be done by means of liquid carbonyls of iron and/or nickel introduced in a finished state into the trap prior to the start of the process or by means of the carbonyl byproducts produced in the process itself. In the latter case liquid carbonyls are accumulated in the trap during the start-up period, after which they are used for spraying the vapor-gas mixture.

The process of producing carbonyls is carried out under continuous circulation of carbon monoxide through the entire setup, which is achieved by a circulation pump.

For a better understanding of the present invention, the following examples of producing carbonyls of the metals of the VIth and VIIth groups and carbonyls of cobalt and vanadium.

EXAMPLE 1

Into a reactor were charged 4.1 kg. of molybdenum pentachloride and 4.1 kg. of iron shavings.

The carbonylation process was carried out at 200° C. and 280 atm. pressure with continuous circulation of carbon monoxide. The yield of molybdenum carbonyl was 59.2% of theory.

The produced vapor-gas mixture consisting of carbonyls of molybdenum and iron as well as carbon monoxide passed into the trap where it was sprayed with liquid iron carbonyl introduced into said trap prior to the start-up of the process.

In the trap 2.336 kg. of molybdenum carbonyl were separated, or 99.7% of the amount of the final product obtained in the reactor.

EXAMPLE 2

Into the reactor were charged 11.5 kg. of tungsten chloride and 11.5 kg. of nickel. The carbonylation process was carried out at 170° C. and 280 atm. pressure with continuous circulation of carbon monoxide.

The yield of tungsten carbonyl was 61.1% of theory.

The produced vapor-gas mixture consisting of the carbonyl vapors of tungsten and nickel as well as carbon monoxide, passed into the trap where it was sprayed with liquid iron carbonyl introduced into the setup prior to the start-up of the process.

In the trap 5.030 kg. of tungsten carbonyl were separated, or 99.4% of the amount of the final product obtained in the reactor.

EXAMPLE 3

Into the reactor were charged 3.2 kg. of cobalt and 2 kg. of nickel. The carbonylation process was carried out at 160° C. and 200 atm. pressure with continuous circulation of carbon monoxide. The yield of cobalt octacarbonyl was 92% of theory.

The produced vapor-gas mixture consisting of the carbonyl vapors of cobalt and nickel as well as carbon monoxide passed into the trap. During the first 30 minutes there was accumulated in the trap a sufficient amount of liquid nickel carbonyl which was subsequently used for continuous spraying of the vapor-gas mixture.

In the trap 8.53 kg. of cobalt octacarbonyl were separated, or 98.7% of the amount of the final product obtained in the reactor.

EXAMPLE 4

Into the reactor were charged 120 g. of rhenium heptaoxide, following which the carbonylation was carried out at 80° C. and 300 atm. pressure with continuous circulation of carbon monoxide. The yield of rhenium carbonyl was 98% of theory.

The produced vapor-gas mixture consisting of vapors of rhenium carbonyl and carbon monoxide passed into the trap where it was sprayed with liquid nickel carbonyl introduced into the trap prior to the start-up of the process.

From the vapour-gas mixture were separated 204 g. of rhenium carbonyl, or 99% of the amount of the final product obtained in the reactor.

EXAMPLE 5

Into the reactor were charged 3.46 kg. of manganese acetate and 3 kg. of triisobutyl aluminum.

The process of carbonylation was carried out at 100° C. and 220 atm. pressure with continuous circulation of carbon monoxide.

The amount of manganese carbonyl obtained were 2.235 kg., or 57.3% of the theoretical yield.

The produced vapor-gas mixture consisting of vapors of manganese carbonyl and carbon monoxide passed into the trap where it was sprayed with liquid iron carbonyl introduced into the trap prior to the start-up of the process.

In the trap 2.224 kg. of manganese carbonyl were separated or 99.5% of the amount of the final product obtained in the reactor.

EXAMPLE 6

Into the reactor were charged 2.35 kg. of ditoluenevanadium and 1 kg. of zinc dust.

The carbonylation process was carried out at 140° C. and 200 atm. pressure with continuous circulation of carbon monoxide. The yield of vanadium carbonyl was 1.05 kg., or 48% of theory.

The produced vapor-gas mixture consisting of vapors of vanadium carbonyl and carbon monoxide passed into the trap where it was sprayed with liquid nickel carbonyl introduced into the trap prior to the start-up of the process.

In the trap 1.04 kg. of vanadium carbonyl were separated, or 99% of the amount of the final product obtained in the reactor.

Though the present invention has been described in accordance with a preferred embodiment, various changes and modifications may be made in carrying out the present invention without departing from the spirit and scope thereof as will be understood by those skilled in the art. These changes and modifications are to be considered as falling within the spirit and scope of the invention as defined in the appended claims.

What we claim is:

1. A method of producing carbonyls of the metals of groups VI and VII and cobalt and vanadium, said method comprising carbonylating a metal of Group VI, VII or cobalt or vanadium, or a compound thereof in the presence of a metal selected from the group consisting of iron and nickel, said carbonylating being effected by heating under pressure with the formation of a vapor-gas mixture and condensing the produced carbonyls from said vapor-gas mixture, the latter being simultaneously sprayed with a liquid carbonyl of a metal selected from the group consisting of iron and nickel.

2. A method according to claim 1, wherein the liquid carbonyl of a metal selected from the group consisting of iron and nickel is produced as a byproduct in the carbonylation of a salt of said iron or nickel.

3. A method according to claim 1, wherein said compound is selected from the group consisting of the oxides, hydroxides, and sulfides.

References Cited

UNITED STATES PATENTS

| | | | |
|---|---|---|---|
| 1,816,122 | 7/1931 | Mittasch et al. | 23—203 |
| 1,941,111 | 12/1933 | Schlecht et al. | 23—203 |
| 2,395,999 | 3/1946 | Fill | 23—203 |
| 2,557,744 | 6/1951 | Hurd | 23—203 |

EARL C. THOMAS, Primary Examiner